United States Patent [19]

Stephanoff

[11] 3,802,089

[45] Apr. 9, 1974

[54] METHOD AND APPARATUS FOR TREATING WASTE PRODUCTS

[75] Inventor: Nicholas N. Stephanoff, Haverford, Pa.

[73] Assignee: Fluid Energy Processing and Equipment Company, Hatfield, Pa.

[22] Filed: Apr. 2, 1973

[21] Appl. No.: 347,201

[52] U.S. Cl............................ 34/8, 34/10, 34/57 E, 34/58
[51] Int. Cl.............................................. F26b 5/08
[58] Field of Search................. 34/8, 10, 57 E, 58

[56] References Cited
UNITED STATES PATENTS
2,441,613  5/1948  Balassa............................. 34/57 E
3,699,662  10/1972  Stephanoff........................... 34/10
2,032,827  3/1936  Andrews............................. 34/57 E
2,844,361  7/1958  Dilcher et al. ..................... 34/57 E
2,118,252  5/1938  Kraft................................. 34/10 X Primary Examiner—John J. Camby
Attorney, Agent, or Firm—Arthur A. Jacobs, Esq.

[57] ABSTRACT

The treatment of sewage, industrial waste and other vegetable and animal wastes by drying and dehydrating this waste material in a fluid energy drying apparatus where the waste matter is subjected to the heat energy of high-temperature gases while being whirled through an arcuate path where the dried particles are centrifugally separated from the less-dried particles.

13 Claims, 7 Drawing Figures

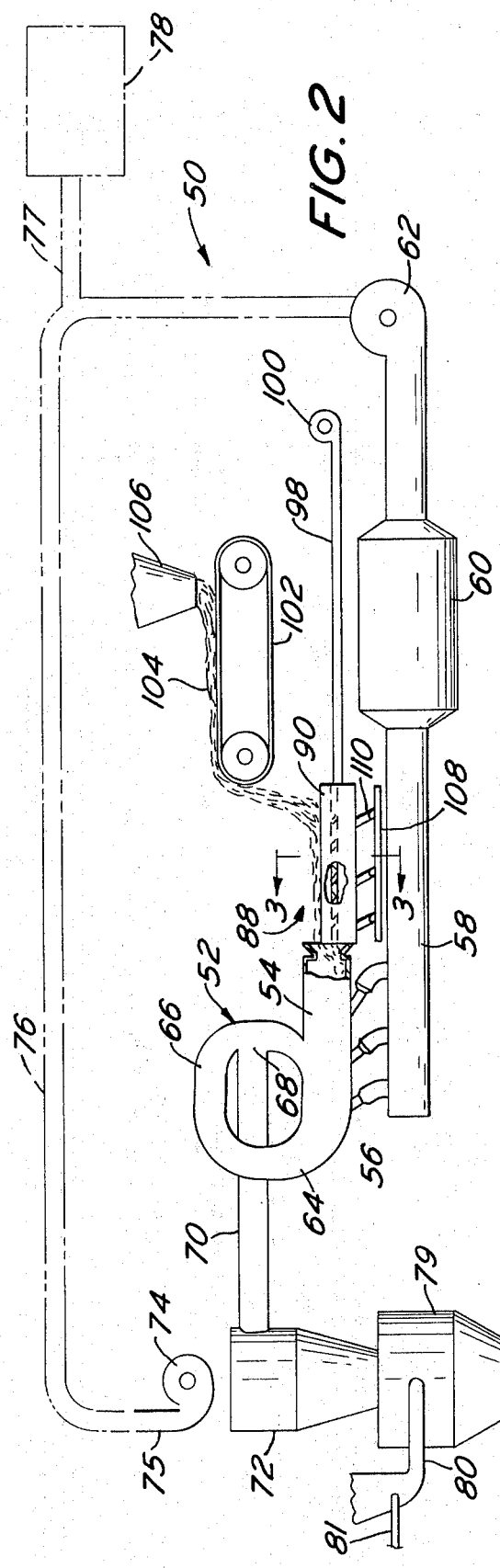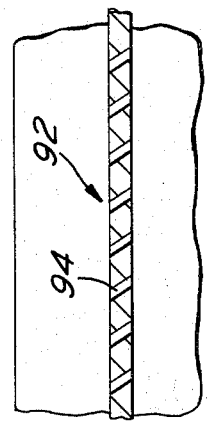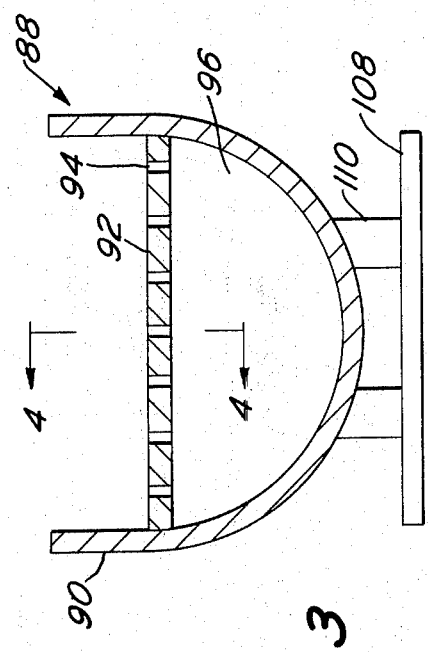

METHOD AND APPARATUS FOR TREATING WASTE PRODUCTS

This invention relates to the treatment of wastes such as contaminated water and similar liquids to remove the contaminants therefrom prior to passage to the sewage system, and it particularly relates to a method and apparatus for the disposal treatment of the waste material.

It is well known that a primary ecological problem is the removal of contaminants from domestic and industrial waste prior to their passage into the sewage system and thence into the sewers, streams, lakes and oceans. Although many different anti-pollution systems are now being used or have been suggested, none adequately solve the problem of how to satisfactorily dispose of the waste material removed from the liquids. In this respect, the general procedure is to set aside large tracts of land as disposal areas, but this, in time, creates a problem of its own since such use of these tracts of land not only remove these lands from any productivity but eventually results in the formation of ecological problems in itself. Furthermore, the waste materials may often, themselves, be used for the production of economically advantageous products, but cannot be so utilized under the present systems of disposal.

It is one object of the present invention to overcome the aforesaid problems by providing a disposal system which is relatively simple and efficient to operate, is relatively inexpensive and which avoids the necessity of using large tracts of land as disposal sites.

Another object of the present invention is to provide a disposal system of the aforesaid type which is adapted to easily and effectively convert a large proportion of the waste material into useful products.

Other objects and many of the attendant advantages of this invention will be readily appreciated as the same becomes better understood by reference to the following description when read in conjunction with the accompanying drawings wherein:

FIG. 2 is a somewhat diagramatic view of a treating system embodying the present invention.

FIG. 3 is an enlarged cross-sectional view of the feeder assembly used in FIG. 2.

FIG. 4 is a sectional view taken on line 4—4 of FIG. 3.

Figure 1:
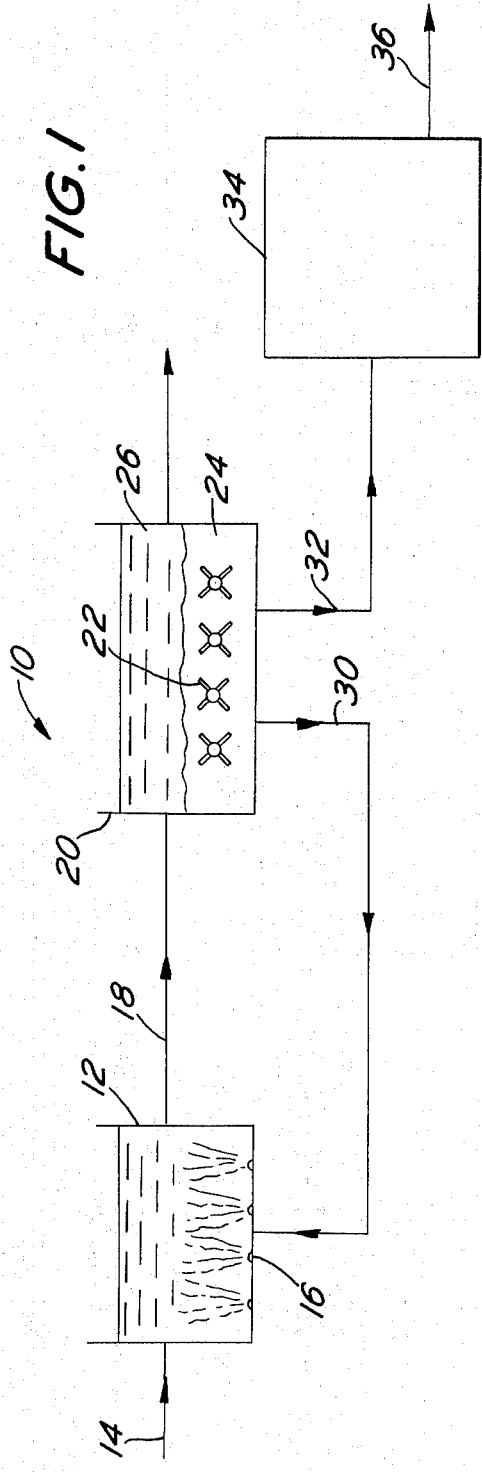
FIG. 1 is a schematic view of a water treatment system which produces waste products utilizable in the present invention.

Referring now in greater detail to the figures of the drawings wherein similar reference characters refer to similar parts, there is shown in FIG. 1 a water-treatment system, generally designated 10, comprising an activation chamber 12 which receives raw water through line 14. The raw water is generally pre-treated by filtration units (not shown) which remove bulk solids such as mud, rocks, grit and other large solids. The water flowing into chamber 12, is, therefore, substantially free of bulk solids but contains large amounts of dispersed and dissolved particles.

The activation chamber 12 is provided with inlets 16 through which a gas, generally air, although oxygen may be used, is bubbled into the water. These air bubbles are utilized by aerobic microorganisms in the water which feed upon the contaminants and grow and die in their life cycle.

The water with the remaining dispersed and dissolved particles as well as with microorganisms passes through line 18 into a clarifier chamber 20.

The clarifier chamber 20 is provided with a series of paddles 22 in its bottom portion. These paddles are one type of mechanism used to agitate the water, although other means may be used where feasible or desirable. As the water is agitated, the bulk solids, such as plastic or rubber particles, float to the top as a scum and may be removed in any manner desired. The dispersed and dissolved particles sink to the bottom and the paddles 22, aided by flocculating agents, not shown, such as lime, polyelectrolites, etc., convert the particles to floc in the bottom layer indicated at 24. This bottom layer is substantially liquid (about 96–99 percent liquid). The upper layer, indicated at 26 is generally acceptable process water which is passed through line 28 into the river, stream, lake or the like or into a chlorination station or which may be used for any purpose desired.

The flocculated substance, called activated sludge, passes through two lines, one line, indicated at 30 passes the sludge back into the activation chamber for further removal of the BOD, while the other line, indicated at 32, passes the sludge to a de-watering unit, indicated generally as 34. The reason for passing a portion of the activated sludge back for recycling through the chamber 12 is to remove excess BOD which was not removed from the first pass through chamber 12. Eventually, equilibrium is reached so that the sludge flowing through line 32 has a substantially reduced amount of BOD.

The de-watering unit 34 may comprise a centrifuge or a vacuum filter or a combination of the two. In any event, a significant amount of the water is removed from the sludge resulting in the formation of a paste-like substance (like shaving cream or toothpaste) containing about 72 to about 85 percent water. This paste-like material passes through line 36.

Although a specific type of water-treating system has been illustrated in FIG. 1, there are many different systems which may be substituted. In any event, the particular system forms no part of the present invention but has been described merely to illustrate the formation of the sludge which is treated by the dryer system shown in FIG. 2.

It is possible to use the dryer system shown in FIG. 2 for either liquid sludge (96–99 percent liquid), relatively solid filter-cake type sludge (less than about 72 percent liquid) or paste-like sludge (about 72–85 percent liquid). However, it is economically preferable to use the paste-like sludge, because the liquid sludge requires preliminary atomization, high pressure air or steam and sometimes other energy input, so that the amount of product obtained is small compared to the energy input required, while, in order to obtain a filter-cake type sludge, it is necessary to utilize intermediate drying systems which add considerably to the time and expense of the process. However, although liquid and filter-type sludge are easily fed to the drying system, difficulty has heretofore been found in feeding paste-like sludge to any drying system because of its slow movement and its tendency to clog the feeding mechanisms. This problem has been effectively solved in the system of FIG. 2.

FIG. 2 shows a dryer system, generally designated 50, comprising a centrifugally actuated fluid energy dryer 52. Briefly described, the raw feed is passed into the inlet section 54 and is entrained by hot gases, such as steam or air, which pass tangentially into the section 54 through tangential nozzles 56 extending from a manifold 58 connected to a heater 60. The heater 60 has a gas inlet connected to a blower 62. The gases from inlets 56 act to disperse and substantially flash-dry the sludge and, as the sludge particles pass through the curved upstack 64, drying continues. The dried particles then pass through a curved classification section 66 where the larger, less dry particles are centrifugally whirled on the outer periphery of the stream and pass back into the inlet section 54 for further drying while the small, lighter, dried particles in the inner peripheral portion of the stream pass through the exhaust outlet 68 and through duct 70 to a collector 72. This exhaust movement is aided by a blower 74.

In collector 72, the dried particles fall to the bottom while any entraining gaseous fluids such as steam or the like, pass upwardly from the blower 74 to a duct 75. From the duct 75, the gaseous fluid may either be exhausted to atmosphere, or may, optionally, be passed through a duct 76. The duct 76 may lead directly back to the blower 62 for use of this pre-heated gaseous fluid in the dryer 52 or may optionally be provided with an auxiliary duct 77 leading to a condenser 78, whereby part of the fluid is directed back into the dryer and part is condensed for use as a liquid, passed through a feed duct 80 by means of a gaseous fluid, under pressure, entering through a conduit 81 from a source, not shown. The gaseous fluid is preferably inserted in a tangential direction to provide a vortex action to agitate the mixture and, thereby, promote the mixing action. These additives may optionally constitute nutrients such as nitrogen, phosphorous and potassium-containing substances which are valuable when the product is to be used as fertilizer. Among such substances are superphosphates, urea and potassium chloride. Other additives may include clay, diatamaceous earth, and the like which, when added to the soil, improve drainage qualities and condition the soil. The additives may also include thickening agents and the like for the fertilizer products themselves. In this respect, some of these additives may be deleteriously affected by the heat used in the dryer whereas, when added to the product in hopper 79, the product is sufficiently cool to obviate such effects.

The particles, either with or without the admixed additives pass through a star-valve 82 or similar device, such as a screw-conveyor, to a palletizer of standard type, indicated at 84 where the particles are formed into pellets and discharged for use through outlet 86.

As previously indicated, the most economically desirable sludge for this drying process is the semi-solid, paste-like type such as obtained from outlet 36 in FIG. 1. However, also as previously indicated, this type of material is the most troublesome to feed. The feed mechanism used in the apparatus of FIG. 2, and which is especially adapted for paste-like materials although it can operate with solids as well, comprises a feed assembly generally designated 88 and consists of an elongated, open-ended U-shaped trough 90 having a cross plate 92 extending the length thereof. The plate is provided with a plurality of apertures or nozzles 94 extending in tangential directions toward the outlet end of the trough 90, as best seen in FIG. 4. Beneath the plate 92 is provided a chamber 96, as best seen in FIG. 3, and this chamber receives a gas, such as air, under pressure from a conduit 98 (see FIG. 2) connected to a blower 100.

A conveyor such as the belt type conveyor shown at 102 receives the paste-like material 104 from a hopper 106, which may, in turn, receive it from the outlet 36 in FIG. 1, and deposits the material on plate 92. As the material rests on plate 92, the tangential air from nozzles 94, which is preferably passed in short pulses or puffs through the nozzles, acts to successively move the material toward the dryer.

Although it is not essential to the operation of the feed mechanism, the conveying movement of th air puffs may be aided by an optionally provided vibrator mechanism comprising a reciprocating plate 108 connected to the trough 90 by links 110 (note FIGS. 2 and 3). This plate 108 may be reciprocated by a motor and eccentric cam assembly or by any other desirable means, not shown. One commercially available vibrator mechanism of this type is the so-called "Syntron" vibrator.

The pulsating air conveying means described above not only effectively moves the paste-like material forward but the puffs or air also act as pneumatic scraper means to prevent adherence of the paste-like material to the plate 92.

Figure 5:
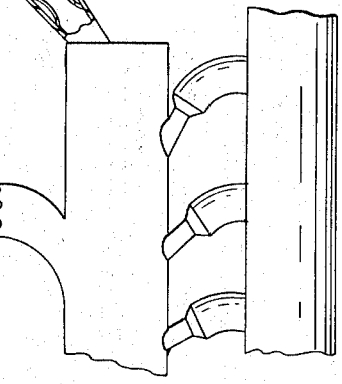

Although the feed means shown in FIGS. 2, 3 and 4 is preferable for the present invention, it is possible to utilize other feed means for solids and liquids. In this respect, FIG. 5 shows a hopper 202 having a duct with a Venturi passage 204 and a conduit 206 leading from a source of air or other gas under pressure. Granular material is fed through the hopper 202 and entrained in the gas from conduit 206 which passes through Venturi passage 204 where the stream is accelerated. The granular material may be substantially wet without deleteriously affecting the feed mechanism.

Figure 6:
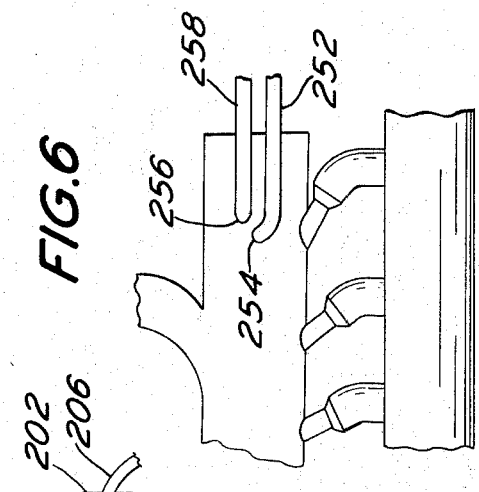

FIG. 6 shows a feed means for liquids comprising a duct 252 leading from the source of liquid material. An offset nozzle 254 is provided at its outlet. An aspirator nozzle 256 at the outlet of a conduit 258, connected to a source of gas under pressure, supplies a gas stream which atomizes the feed material as it flows from nozzle 254 and propels the atomized liquid into the inlet section of the mill.

Figure 7:
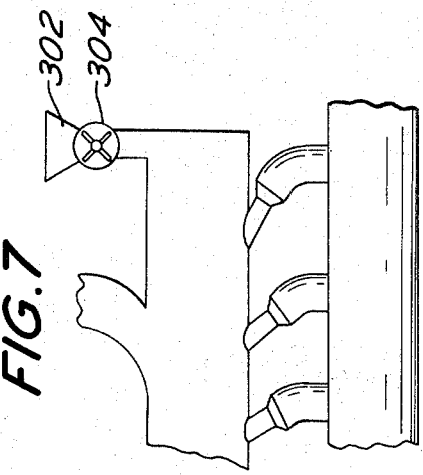
FIGS. 5, 6 and 7 are somewhat diagrammatic views of alternative feeder assemblies.

FIG. 7 shows a hopper 302 having a star valve 304 at its inlet end, the valve being in communication with the inlet section of the mill. This feed arrangement is best used with granular solids that have been substantially de-wetted.

The invention has been described above with relation to the treatment of sludge from a waste-treatment system. It is, however, equally as well adapted to the treatment of all types of industrial waste including wastes from the processing of wood and wood pulp, from vegetable and animal wastes. For example, it may be used for the dehydration of vegetable waste for the extraction of vitamins, for the drying of waste leafy vegetables such as kale, broccoli and the like to extract riboflavin, for the dehydration of potato peelings, carrots, pea shells, artichokes, etc., to obtain food supplements and nutrients, for the treatment of fructose, etc. It is also utilizable for the processing of pharmaceutical wastes such as fermentation wastes and the like. Many other drying and dehydration treatments of vegetable and animal wastes are within the scope of the invention.

The invention claimed is:

1. A method of treating substantially liquid waste material containing dispersed solid particles, which comprises passing said waste material through a dryer comprising a generally arcuate, tubular housing while entraining said material in tangentially-directed, heated gaseous streams whereby said gaseous streams centrifugally whirl said waste material through said housing while dispersing and substantially drying the solid particles in said material, centrifugally separating the drier, lighter particles from the wetter, heavier particles and centrifugally exhausting said lighter particles while recycling said heavier particles for further entrainment in said gaseous streams, and thereafter separating the exhausted particles, constituting a product, from any entraining gaseous fluid.

2. The method of claim 1 wherein said waste material is substantially liquid in texture.

3. The method of claim 1 wherein said waste material is semi-solid of paste-like consistency.

4. The method of claim 1 wherein said waste material is a wet solid.

5. The method of claim 1 wherein additives to provide specific properties are inserted into said product.

6. The method of claim 1 wherein said waste material is pneumatically fed into the dryer by subjecting said material to intermittent puffs of angularly-directed gaseous fluid.

7. The method of claim 1 wherein the gaseous fluid that is separated from the exhausted particles is at least partially recycled back into said tangentially-directed, heated gaseous streams.

8. The method of claim 1 wherein the gaseous fluid that is separated from the exhausted particles is at least partially condensed for further use.

9. A waste-treating system comprising a relatively tubular dryer having an inlet section connected to a generally arcuate classification section, tangentially disposed gas inlet nozzles in said inlet section, means for supplying heated gaseous fluid to said inlet nozzles, feed means constructed and arranged to insert substantially liquid waste material having dispensed solid particles into said inlet section, and exhaust means from said classification section, the gaseous fluid from said gas inlet nozzles acting to substantially dry the solid particles in said waste material and centrifugally carry said particles through said classification chamber in a manner to centrifugally separate the drier, lighter particles from the wetter, heavier particles, causing the lighter particles to pass through said exhaust means while the heavier particles return to said inlet section, and means for collecting the dried particles from said exhaust means while separating the entraining gaseous fluid therefrom, said feed means comprising an elongated trough having an inlet at one end and an outlet at the opposite end, said trough also having a cross plate extending from side to side thereof and also longitudinally thereof to form a chamber under said plate and between the side walls of said trough, said plate having apertures therein which are in fluid communication with said chamber and are inclined from said chamber toward the outlet end of said trough, and means to supply gaseous fluid under pressure to said chamber.

10. The system of claim 1 wherein vibratory means are operatively connected to said trough.

11. The system of claim 1 wherein means are provided to insert specified additives to said dried particles.

12. The system of claim 1 wherein said exhaust means is in fluid connection with said means for supplying heated gaseous fluid.

13. The system of claim 1 wherein said exhaust means is in fluid connection with a condenser.

* * * * *

UNITED STATES PATENT OFFICE
CERTIFICATE OF CORRECTION

Patent No. 3,802,089          Dated May 8, 1974

Inventor(s) Nicholas N. Stephanoff

It is certified that error appears in the above-identified patent and that said Letters Patent are hereby corrected as shown below:

In column 3, line 30 of the specification, after "liquid", change the comma to a period and add: "The solid particles pass from the collector 72 into a hopper 79 where they may, desired, be admixed with certain additives---"

Signed and sealed this 19th day of November 1974.

(SEAL)
Attest:

McCOY M. GIBSON JR.          C. MARSHALL DANN
Attesting Officer          Commissioner of Patents